United States Patent
Ozaki et al.

(10) Patent No.: US 9,511,553 B2
(45) Date of Patent: Dec. 6, 2016

(54) OPTICAL ELEMENT MANUFACTURING METHOD AND SURFACE PROCESSING DEVICE

(71) Applicant: Olympus Corporation, Tokyo (JP)

(72) Inventors: Motoaki Ozaki, Tokyo (JP); Hiroyuki Seki, Tokyo (JP)

(73) Assignee: Olympus Corporation, Hachioji-shi, Tokyo (JP)

( * ) Notice: Subject to any disclaimer, the term of this patent is extended or adjusted under 35 U.S.C. 154(b) by 392 days.

(21) Appl. No.: 14/153,443

(22) Filed: Jan. 13, 2014

(65) Prior Publication Data

US 2014/0124967 A1  May 8, 2014

Related U.S. Application Data

(63) Continuation of application No. PCT/JP2012/071985, filed on Aug. 30, 2012.

(30) Foreign Application Priority Data

Sep. 22, 2011  (JP) .................................. 2011-208011

(51) Int. Cl.
  *B29D 11/00*  (2006.01)
  *G02B 3/00*  (2006.01)
  (Continued)

(52) U.S. Cl.
  CPC ......... *B29D 11/0074* (2013.01); *B29C 33/424* (2013.01); *B29C 43/50* (2013.01);
  (Continued)

(58) Field of Classification Search
  CPC ........ B29C 33/424; B29C 43/50; B29C 43/18; B29C 43/021; B29D 11/0074; G02B 3/0018
  See application file for complete search history.

(56) References Cited

U.S. PATENT DOCUMENTS

| 6,740,265 B2* | 5/2004 | Matsumoto ......... B29C 37/0003 |
| | | 264/1.34 |
| 2006/0208374 A1* | 9/2006 | Shimotsuma ......... B29C 39/026 |
| | | 264/1.7 |

FOREIGN PATENT DOCUMENTS

| CN | 1815269 A | 8/2006 |
| JP | 2002182010 A | 6/2002 |

(Continued)

OTHER PUBLICATIONS

Chinese Office Action issued for counterpart application No. CN 201280033092.2, mail date Dec. 18, 2014 (English translation attached).

(Continued)

*Primary Examiner* — Mathieu Vargot
(74) *Attorney, Agent, or Firm* — Arent Fox LLP

(57) ABSTRACT

A method includes: a main body processing step of forming a lens main body having the concave lens surface; a molding step of coating a molding resin on the concave lens surface, pressing a microstructure forming mold, having a molding surface portion transferring the reflection preventing part formed on the surface of a deformable base body part thereof, against the concave lens surface, and curing the molding resin; and a mold release step of exerting a moment of a force relating to the surface top of the molding surface portion so as to deform the base body part to gradually separate the microstructure forming mold from an outer peripheral side thereof in a direction in which the concavo-convex shape of the reflection preventing part extends, thereby performing mold release.

18 Claims, 11 Drawing Sheets

(51) Int. Cl.
    *B29C 33/42*    (2006.01)
    *B29C 43/50*    (2006.01)
    B29C 43/18    (2006.01)
    B29L 11/00    (2006.01)
    B29C 43/02    (2006.01)

(52) U.S. Cl.
    CPC .......... *G02B 3/0018* (2013.01); *B29C 43/021* (2013.01); *B29C 43/18* (2013.01); *B29C 2043/025* (2013.01); *B29L 2011/0016* (2013.01)

(56) References Cited

FOREIGN PATENT DOCUMENTS

| JP | 2004-012856 A | | 1/2004 |
|---|---|---|---|
| JP | 2006-039450 | * | 2/2006 |
| JP | 2008035779 A | | 2/2006 |
| JP | 2006-212859 A | | 8/2006 |
| JP | 2006-317807 A | | 11/2006 |
| JP | 2007-055008 A | | 3/2007 |
| JP | 2010-120316 A | | 6/2010 |

OTHER PUBLICATIONS

International Search Report for PCT/JP2012/071985, mailing date Oct. 16, 2012.
Final Office Action for corresponding Japanese application No. 2011-208011, date of mailing Mar. 15, 2016.

* cited by examiner

OPTICAL ELEMENT MANUFACTURING METHOD AND SURFACE PROCESSING DEVICE

This application is a continuation application based on PCT/JP2012/071985, filed on Aug. 30, 2012, claiming priority based on Japanese Patent Application No. 2011-208011, filed in Japan on Sep. 22, 2011. The contents of both the Japanese Patent Application and the PCT Application are incorporated herein by reference.

TECHNICAL FIELD

The present invention relates to an optical element manufacturing method and a surface processing device. For example, the present invention relates to an optical element manufacturing method and an optical element surface processing device for forming a microstructure, such as a reflection preventing structure.

BACKGROUND ART

In recent years, a reflection-preventing film is provided on a lens surface of an imaging lens of, for example, a camera or the like in order to prevent reflection of unnecessary light, such as a ghost or a flare.

As the reflection-preventing film provided on the surface of an optical element, such as the lens, for example, there is known a multilayer thin film on which a high refractive index layer and a low refractive index layer are alternately and appropriately superimposed on each other according to the wavelength of light at which reflection is prevented. Although such a multilayer reflection-preventing film is formed by a vacuum process, such as vacuum evaporation or sputtering, since the multilayer reflection-preventing film needs to provide the multi-layer thin film of which the film thickness is managed, the treatment time becomes long. Additionally, since the directivity is high in the vacuum process, the film thickness varies depending on the lens shape at a central portion and an outer peripheral portion, for example, in the case of a lens in which the amount of irregularity of the outer peripheral portion with respect to the central portion is higher. For this reason, a reflection-preventing film that has uniform reflection preventing characteristics over the entire lens surface cannot be obtained, for example, a reflection-preventing film in which the reflection preventing characteristics of the outer peripheral portion are inferior to the central portion is obtained.

As a reflection preventing structure that is not based on such a multilayer thin film, as described in Japanese Unexamined Patent Application, First Publication No. 2006-317807, for example, there is known a reflection preventing structure in which a microstructure is formed in units of a triangular pyramid, a quadrangular pyramid, or the like on a lens surface so that refractive index variation occurs in the vicinity of the lens surface.

In Japanese Unexamined Patent Application, First Publication No. 2006-317807, an X-ray mask in which triangular prisms are arrayed at a minute pitch is formed, and a resist coated on a lens via this X-ray mask is exposed to X rays to form a triangular pyramidal microstructure on a lens surface, and RF dry etching is further performed to transfer a triangular pyramidal microstructure to a lens surface to form a master having a reflection preventing structure on the surface thereof. Next, a technique of transferring the shape of this master to manufacture a Ni duplicating mold through an electroforming process and of manufacturing a lens having a reflection preventing structure on the surface thereof through molding using this Ni duplicating mold is described.

Additionally, in Japanese Unexamined Patent Application, First Publication No. 2004-12856, a technique of molding a reflection preventing part in which fine conical convex portions are arranged substantially densely is described. In the technique in Japanese Unexamined Patent Application, First Publication No. 2004-12856, a thin layer of an etching rate gradient material is formed on a molding surface of a forming mold made of a glass plate, a photoresist film is formed on the surface of this thin layer, exposure and development are performed on this photoresist film, to form a mask with a predetermined pattern, and the etching rate gradient material layer is etched via this mask. Accordingly, a forming mold that transfers the shape of the reflection preventing part is formed. Then, by performing press molding using this forming mold, an optical element in which the shape of the reflection preventing part is transferred to the lens surface is formed.

SUMMARY OF THE INVENTION

Solution to Problem

According to an optical element manufacturing method related to a first aspect of the present invention, there is provided a method of manufacturing an optical element including, on an optical surface with a curvature, a microstructure having a concavo-convex shape extending in a direction intersecting an optical axis. The manufacturing method includes: a main body processing step of forming an optical element main body having the optical surface; a molding step of coating a molding resin on the optical surface, pressing a microstructure forming mold, having a molding surface transferring the microstructure formed on a surface of a deformable base body thereof, against the optical surface, and curing the molding resin; and a mold release step of exerting a moment of a force relating to a surface top of the molding surface on the microstructure forming mold so as to deform the base body to gradually separate the microstructure forming mold from an outer peripheral side thereof in a direction in which the concavo-convex shape extends, thereby performing mold release of the microstructure forming mold.

According to the optical element manufacturing method related to a second aspect of the present invention, in the above first aspect, in the mold release step, a central portion of the microstructure forming mold may be held down when the microstructure forming mold is released at least from the outer peripheral side.

According to the optical element manufacturing method related to a third aspect of the present invention, in the above first aspect or the above second aspect, in the mold release step, the moment of the force may be exerted to change the partial curvature of the surface of the base body which the molding surface is formed from the outer peripheral side of the microstructure forming mold and to gradually separate the microstructure forming mold in the direction in which the concavo-convex shape extends.

According to the optical element manufacturing method related to a fourth aspect of the present invention, in any one of the above first aspect to the above third aspect, the microstructure is a reflection preventing structure in which pyramidal bodies are assembled.

According to an optical element surface processing device related to a fifth aspect of the present invention, there is provided an optical element surface processing device for forming, on an optical surface with curvature, a microstructure having a concavo-convex shape extending in a direction intersecting an optical axis. The processing device includes: a holding part which holds an optical element main body having the optical surface and having a molding resin coated on the optical surface; a microstructure forming mold which has a molding surface to which the microstructure is transferred on the surface of a deformable base body; a mold pressing part which moves the microstructure forming mold relative to the optical surface having the molding resin coated thereon to bring the molding surface into close contact with the molding resin; a resin curing part which cures the molding resin sandwiched between the optical surface and the molding surface of the microstructure forming mold; a mold-deforming part which causes a moment of a force relating to a surface top of the molding surface on the microstructure forming mold to be exerted and which causes the base body to be deformed from an outer peripheral side of the microstructure forming mold so that the molding surface is gradually separated from the molding resin in a direction in which the concavo-convex shape extends; and a mold releasing and moving part that moves the microstructure forming mold and the holding part relative to each other so as to be separated from each other in the direction of the optical axis when the separation proceeds to a central portion of the molding surface using the mold-deforming part.

According to the optical element surface processing device related to a sixth aspect of the present invention, in the above fifth aspect, the mold-deforming part may include a center pressing member which holds down a central portion of the microstructure forming mold, and an outer-peripheral-side moving member which causes the outer peripheral side of the microstructure forming mold to move above the optical surface.

According to the optical element surface processing device related to a seventh aspect of the present invention, in the above fifth aspect or the above sixth aspect, the microstructure may be a reflection preventing structure in which pyramidal bodies are assembled.

DESCRIPTION OF EMBODIMENTS

Figure 1A:
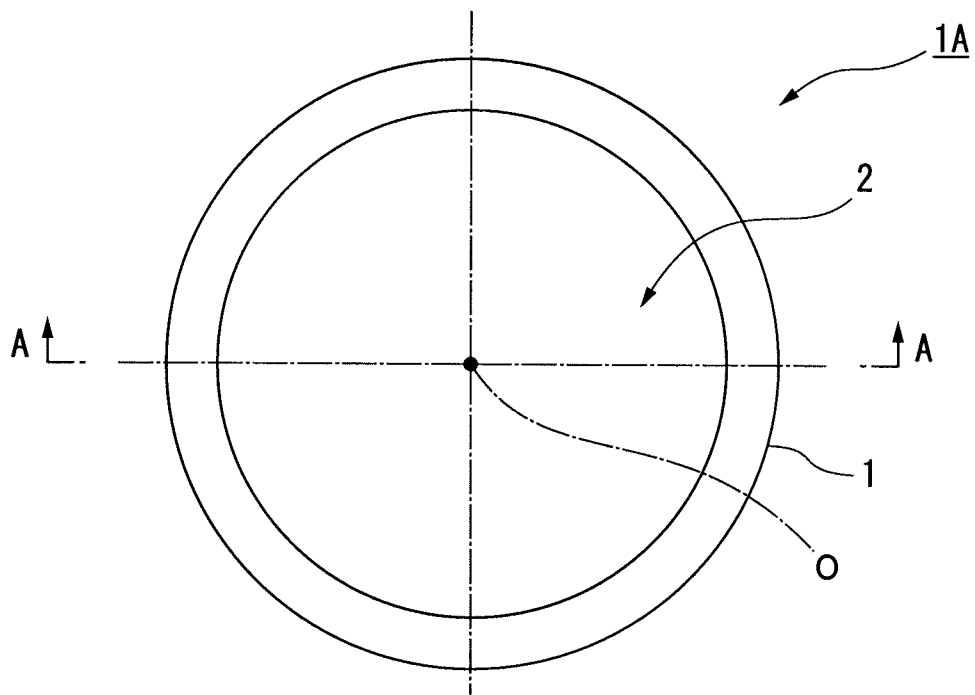
FIG. 1A is a typical plan view showing the configuration of an optical element manufactured by an optical element manufacturing method of a first embodiment of the present invention.

Hereinafter, embodiments of the present invention will be described with reference to the accompanying drawings. In all the drawings, even in the case of different embodiments, the same reference numerals will be given to the same or equivalent members, and a common description will be omitted here.

First Embodiment

An optical element surface processing device used for an optical element manufacturing method of a first embodiment of the present invention will be described.

Figure 1B:
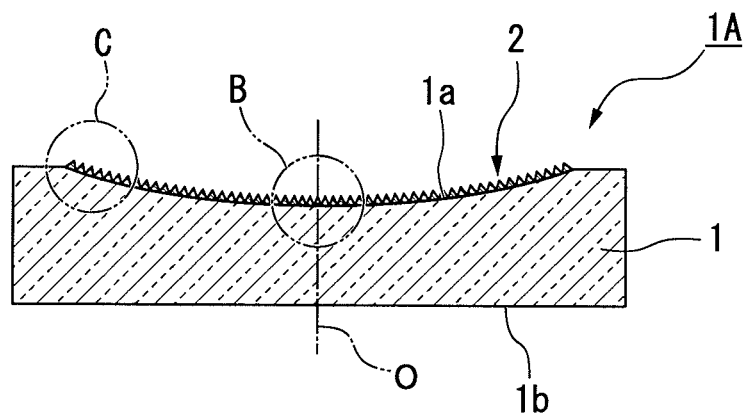
FIG. 1B is an A-A cross-sectional view of FIG. 1A.
Figure 1C:
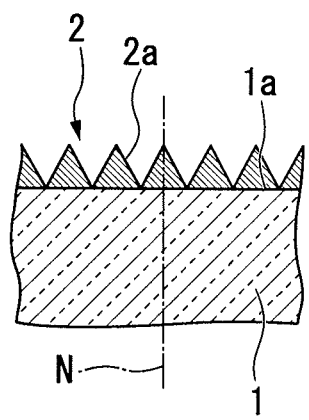
FIG. 1C is a detailed view of a B part of FIG. 1B.
Figure 1D:
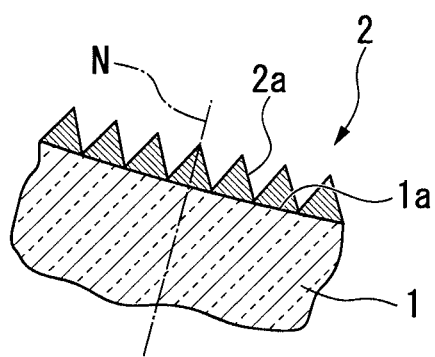
FIG. 1D is a detailed view of a C part of FIG. 1B.
Figure 2A:
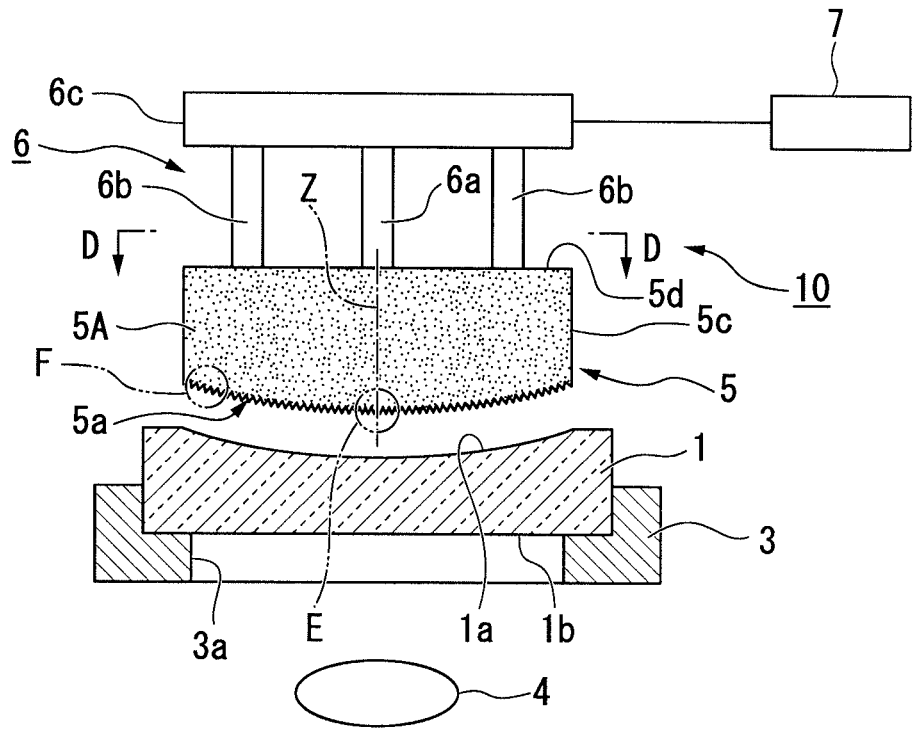
FIG. 2A is a typical configuration view of an optical element surface processing device in the first embodiment of the present invention.
Figure 2B:
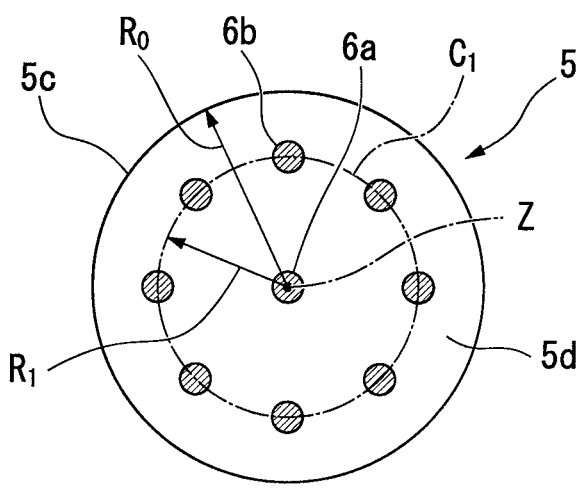
FIG. 2B is a D-D cross-sectional view of FIG. 2A.
Figure 2C:
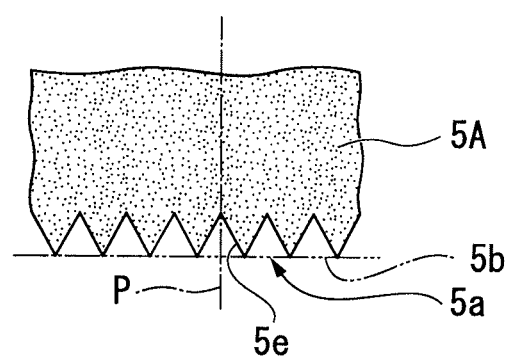
FIG. 2C is a detailed view of an E part of FIG. 2A.
Figure 2D:
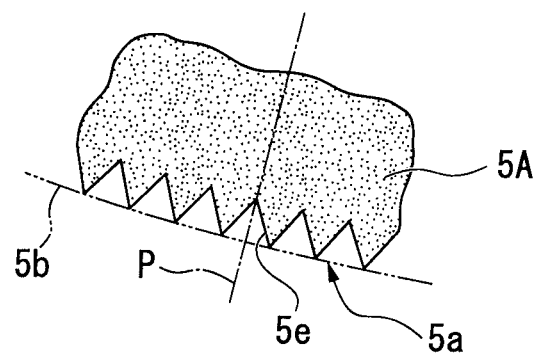
FIG. 2D is a detailed view of an F part of FIG. 2A.

FIG. 1A is a typical plan view showing the configuration of an optical element manufactured by the optical element manufacturing method of the first embodiment of the present invention. FIG. 1B is an A-A cross-sectional view in FIG. 1A, FIG. 1C is a detailed view of a B part of FIG. 1A, and FIG. 1D is a detailed view of a C part of FIG. 1A. FIG. 2A is a typical configuration view of the surface processing device of the first embodiment of the present invention. FIG. 2B is a D-D cross-sectional view in FIG. 2A, FIG. 2C is a detailed view of an E part of FIG. 2A, and FIG. 2D is a detailed view of an F part of FIG. 2A.

The optical element manufacturing method of the present embodiment is a method of manufacturing an optical element having a concavo-convex microstructure, extending in a direction intersecting an optical axis, on an optical surface with curvature.

The type of optical element is not particularly limited if the optical element has a concavo-convex microstructure, extending in a direction intersecting an optical axis, on an optical surface with curvature.

In the following, as an example, as shown in FIGS. 1A to 1D, a case where a workpiece is a lens main body 1 (optical element main body) and the microstructure is a reflection preventing structure based on a reflection preventing part 2 will be described as an example.

That is, in the present embodiment, a case where the reflection preventing part 2 is formed in the lens main body 1 to manufacture a lens 1A that is the optical element will be described.

The lens main body 1 is a single plano-concave lens including a spherical concave lens surface 1a (an optical surface with curvature) and a plane lens surface 1b.

The concave lens surface 1a is processed with a surface shape and surface precision based on the design specification of the lens before the reflection preventing part 2 is formed.

The material of the lens main body 1 may be glass or synthetic resin. Additionally, a method of forming the concave lens surface 1a may be polishing or molding.

In the lens 1A, it is also possible to provide the reflection preventing part 2 on the plane lens surface 1b. In this case, since the plane lens surface 1b is a plane (curvature is 0) with no curvature, the plane lens surface may be formed similar to the related art before or after the reflection preventing part 2 is formed on the concave lens surface 1a.

In the following, a configuration in which the reflection preventing part 2 is not formed on the plane lens surface 1b will be described.

The reflection preventing part 2, as shown in FIGS. 1C and 1D, is an aggregate of conical projections 2a that are densely arranged on the concave lens surface 1a.

The central axis of each projection 2a, in the present embodiment, coincides with the direction of a normal line N of the concave lens surface 1a at a position where each projection 2a is provided. However, the directions of the central axes of the projections 2a may have variation within a range where reflectivity is allowable.

Additionally, in the present embodiment, each projection 2a is formed from a UV-curable resin. As the kind of UV-curable resin, a material whose refractive index difference becomes as small as possible is selected according to the refractive index of the material of the lens main body 1. For example, in the present embodiment, when the lens main body 1 is a COP (cycloolefin polymer) resin (refractive index of 1.5), PAK-02 (tradename; made by Toyo Gosei Co. Ltd.; refractive index of 1.5) is adopted as the UV-curable resin.

The shape of the projections 2a can be appropriately set according to the target value of a wavelength or reflectivity for preventing reflection. In the present embodiment, as an example, in order to cause the reflectivity on the concave lens surface 1a of incident light with a wavelength of 380 nm to 780 nm to be equal to or less than 1%, the respective projections 2a have a shape such that the bottom surfaces thereof have a diameter of about 200 nm and the height thereof is about 200 nm, and are substantially uniformly arranged at adjacent intervals of about 200 nm.

The reflection of incident light is suppressed by virtue of such a configuration because the refractive index varies continuously from 1 to 1.5 within a range of 200 nm in height on the concave lens surface 1a.

In the present embodiment, such a lens 1A is manufactured by forming the reflection preventing part 2 on the concave lens surface 1a of the lens main body 1, using a surface processing device 10 shown in FIG. 2A.

The schematic configuration of the surface processing device 10 includes a holding part 3, a UV light source 4 (resin curing part), a microstructure forming mold 5, a mold moving part 6 (a mold pressing part, a mold-deforming part, a mold releasing and moving part), and a mold movement control unit 7 (a mold pressing part, a mold-deforming part, a mold releasing and moving part).

The holding part 3 holds the lens main body 1 when the surface processing is performed. In the present embodiment, the holding part 3 can hold an outer peripheral portion of the plane lens surface 1b and a lens side surface in a state where an optical axis O is aligned with the vertical axis and the concave lens surface 1a is directed upward.

A hole portion 3a that opens more largely than the lens effective diameter of the lens 1A is provided through a central portion of the holding part 3.

A positional relationship is established such that the central axis of the hole portion 3a is aligned with the optical axis O of the lens main body 1 held by the holding part 3.

The UV light source 4, which is a light source that irradiates the lens main body 1 with ultraviolet light (UV light), is used in order to cure the UV-curable resin coated on the concave lens surface 1a. In the present embodiment, the UV light source 4 is arranged at a position that overlaps the center of the hole portion 3a below the holding part 3. For this reason, UV light emitted upward from the UV light source 4 passes through the hole portion 3a, enters the lens main body 1, and is emitted onto an entire surface of the concave lens surface 1a.

In the microstructure forming mold 5, a molding surface portion 5a (molding surface) that transfers a microstructure is formed on the surface of a deformable base body part 5A (base body) in order to mold the reflection preventing part 2 on the concave lens surface 1a.

The outer shape of the microstructure forming mold 5 is a substantially columnar outer shape, and a central axis Z of the microstructure forming mold 5 is arranged along the vertical axis, and is aligned with the optical axis O of the lens main body 1 held by the holding part 3. An upper surface 5d having the molding surface portion 5a provided on a lower surface thereof is arranged above the holding part 3.

The molding surface portion 5a is formed on the lower surface of the base body part 5A, and the upper surface 5d of the base body part 5A is a plane when there is no deformation caused by an external force.

Additionally, an upper portion of the microstructure forming mold 5 is connected to lower end portions of movable shafts 6a and 6b of the mold moving part 6 to be described below.

In the molding surface portion 5a, a concavo-convex shape obtained by reversing the concavo-convex shape of the reflection preventing part 2 is formed on a convex surface 5b (refer to two-dot chain lines of FIGS. 2C and 2D) with the same curvature as the concave lens surface 1a in order to transfer the shape of the reflection preventing part 2 to the concave lens surface 1a.

In the present embodiment, the shape of the molding surface portion 5a is a shape in which a number of conical holes 5e obtained by reversing the shape of the projections 2a are formed on the convex surface 5b. The central axis of each hole 5e coincides with the direction of a normal line P of the convex surface 5b at a position where each hole 5e is provided.

The material of the microstructure forming mold 5 includes, for example, an elastic body, such as rubber or elastomer, which is low in elastic modulus and is easily deformed. For this reason, if a portion of the microstructure forming mold 5 receives an external force, the microstructure forming mold 5 is deformed according to a stress generated by the external force, and the convex surface 5b provided with the molding surface portion 5a is also deformed depending on the direction of the external force.

In the present embodiment, as an example, rubber composed of a silicon compound is used as the material of the microstructure forming mold 5.

The mold moving part 6 is arranged parallel to the vertical axis above the microstructure forming mold 5. The mold moving part 6 includes the movable shafts 6a and 6b having the lower end portions connected to the upper surface 5d, and a shaft moving mechanism 6c that holds upper end portions of the movable shafts 6a and 6b and independently advances and retracts the movable shafts, along the vertical axis.

The movable shaft 6a, as shown in FIG. 2B, is arranged coaxially with the central axis Z of the microstructure forming mold 5. For this reason, a central portion of the upper surface 5d of the microstructure forming mold 5 can be pulled up or pushed down along the vertical axis by advancing and retracting the movable shaft 6a along the vertical axis.

The movable shafts 6b are arranged at positions that divide one circle $C_1$ centered on the central axis Z equally in a circumferential direction between the central axis Z of the microstructure forming mold 5 and a cylindrical outer peripheral surface 5c of the microstructure forming mold 5. For this reason, the respective movable shafts 6b can be pulled up or pushed down along the vertical axis on the circumference of the circle $C_1$ by synchronously advancing and retracting the respective movable shafts 6b along the vertical axis.

Here, the radius $R_1$ of the circle $C_1$ on which the movable shafts 6b are arranged is set so that, when the position of the movable shaft 6a is fixed and the movable shafts 6b are pulled up gradually, the convex surface 5b is deformed substantially in the direction of the normal line P of the shape of the convex surface 5b before deformation at individual points while being deformed by at least the height of the projections 2a of the reflection preventing part 2. Since the radius $R_1$ of such a circle $C_1$ varies depending on conditions, such as the curvature of the convex surface 5b, the whole shape of the microstructure forming mold 5, and the longitudinal elastic modulus, transverse elastic modulus, or the like of the material of the microstructure forming mold 5, the radius of such a circle is set in advance by experiments, simulations, or the like.

For example, when the microstructure forming mold 5 has a flat shape similar to a disk as shown in FIG. 2A, it is preferable to satisfy at least the relationship between $R_0/2 \leq R_1 < R_0$ if the radius of the outer peripheral surface 5c is defined as $R_0$.

Additionally, the number of the movable shafts 6b can be appropriately set according to the rigidity of the microstructure forming mold 5. Eight movable shafts are shown as an example in FIG. 2B.

As the number of the movable shafts 6b becomes larger, the deformation of the convex surface 5b in the circumferential direction can be more equalized.

The shaft moving mechanism 6c is fixed above the holding part 3 by a supporting member that is not shown.

Additionally, the shaft moving mechanism 6c is electrically connected to the mold movement control unit 7 that controls the advance or retraction amounts of the movable shafts 6a and 6b.

As the specific configurations of the shaft moving mechanism 6c, configurations, such as an actuator using a drive mechanism, such as a motor, and an actuator using fluid driving, such as an air cylinder, can be adopted.

The mold movement control unit 7 includes a parallel movement mode and a mold release mode as control modes where the shaft moving mechanism 6c is controlled.

The parallel movement mode is a control mode where the relative positions of the movable shafts 6a and 6b are adjusted to form the reference state of the microstructure forming mold 5 so that the curvature of the convex surface 5b of the microstructure forming mold 5 substantially coincides with the curvature of the concave lens surface 1a, and the reference state is maintained to synchronize the movement distances of the movable shafts 6a and 6b. This allows the microstructure forming mold 5 to be moved in parallel along the vertical axis.

Here, "substantially coincides" includes a case where the curvature of the convex surface 5b and the curvature of the concave lens surface 1a coincide with each other, and a case where the curvatures are different from each other about within a range where there is no difficulty in molding. The range where there is no difficulty in molding means that a molding space within an allowable shape error range of the reflection preventing part 2 is formed between the concave lens surface 1a and the molding surface portion 5a when the convex surface 5b is pressed against the concave lens surface 1a. That is, since the microstructure forming mold 5 is formed from an elastic body, such as rubber, which is easily deformed, even if the curvature of the convex surface 5b is different from the curvature of the concave lens surface 1a, there is no difficulty in molding if the convex surface 5b is deformed to imitate the concave lens surface 1a when being pressed against the concave lens surface 1a.

The mold release mode is a control mode where the movable shafts 6a and 6b are independently driven with different movement distances. Specifically, the mold release mode is a control mode where the operation of fixing the position of the movable shaft 6a to synchronize and pull up the respective movable shafts 6b gradually upward along the vertical axis and the operation of releasing the fixation of the position of the movable shaft 6a to pull up the movable shaft 6a so as to follow the movement of the movable shafts 6b are performed.

In the present mode, since the movable shafts 6b give forced displacement, the upper surface 5d is deformed in a concave shape, and thereby, the whole base body part 5A is deformed from the reference state. As a result, a stress distribution is produced at a lower portion of the base body part 5A, the convex surface 5b is deformed, and the average curvature of the convex surface 5b increases.

Next, an example of a method of manufacturing the microstructure forming mold 5 will be described.

FIGS. 3A to 3D are typical process explanatory views showing manufacturing processes of the microstructure forming mold of the first embodiment of the present invention. FIG. 3E is a detailed view of a G part of FIG. 3D. FIGS. 4A and 4B are typical process explanatory views showing manufacturing processes, subsequent to FIG. 3D, of the microstructure forming mold of the first embodiment of the present invention.

Figure 3A:
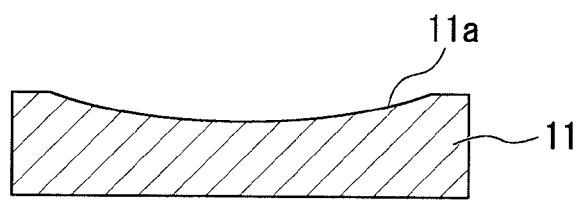
FIG. 3A is a typical process explanatory view showing a manufacturing process of the microstructure forming mold of the first embodiment of the present invention.
Figure 4A:
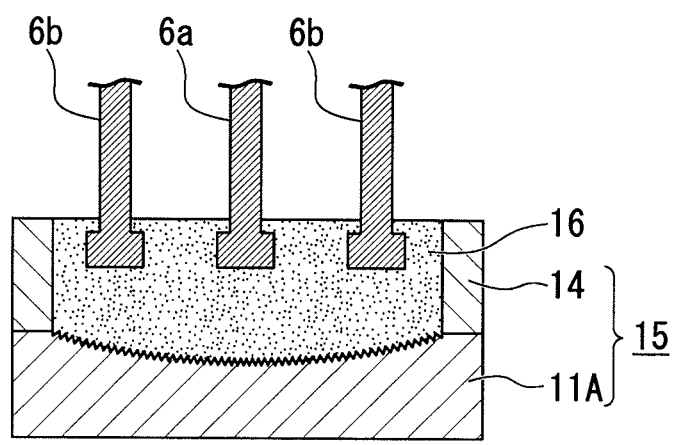
FIG. 4A is a typical process explanatory view showing a manufacturing process, subsequent to FIG. 3D, of the microstructure forming mold of the first embodiment of the present invention.
Figure 4B:
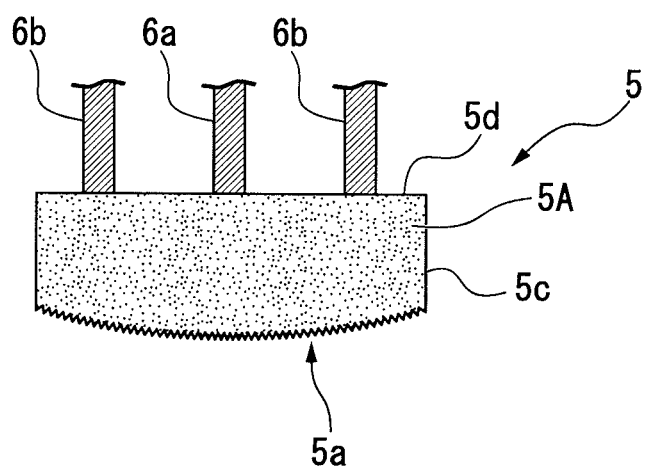
FIG. 4B is a typical process explanatory view showing a manufacturing process, subsequent to FIG. 3D, of the microstructure forming mold of the first embodiment of the present invention.

In order to manufacture the microstructure forming mold 5, as shown in FIG. 3A, there is produced a master base material 11 in which a base material surface 11a including a concave surface of the same shape as the concave lens surface 1a is formed in one plate surface of a plate member made of, for example, a metal, such as nickel.

Figure 3B:
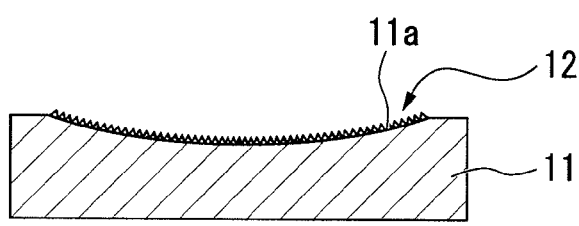
FIG. 3B is a typical process explanatory view showing a manufacturing process, subsequent to FIG. 3A, of the microstructure forming mold of the first embodiment of the present invention.

Next, as shown in FIG. 3B, a microstructure body 12 is formed on the base material surface 11a of the master base material 11.

The shape of the microstructure body 12 has the same shape that of the reflection preventing part 2.

The microstructure body 12 can be formed, for example, by removing an exposure portion after a resist is coated on the base material surface 11a and a shape pattern is exposed with an electron beam drawing unit.

Figure 3C:
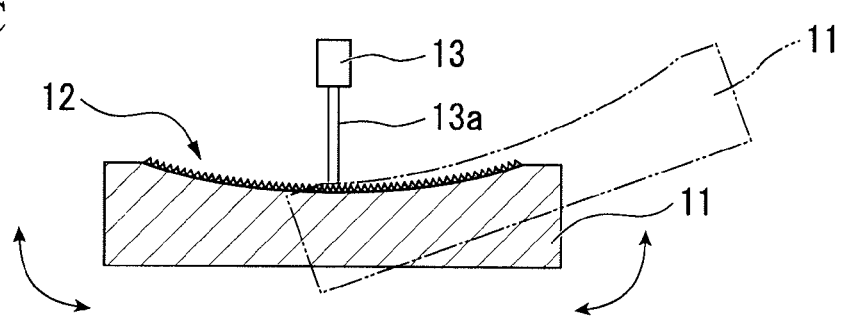
FIG. 3C is a typical process explanatory view showing a manufacturing process, subsequent to FIG. 3B, of the microstructure forming mold of the first embodiment of the present invention.

Next, as shown in FIG. 3C, anisotropic etching is performed until an etching beam 13a is emitted along the direction of a normal line of the base material surface 11a from a dry etching unit 13 and the microstructure body 12 is removed. At this time, the master base material 11 is held by a swing unit that is not shown, and is swung with the center of curvature of the base material surface 11a as a center.

Figure 3D:
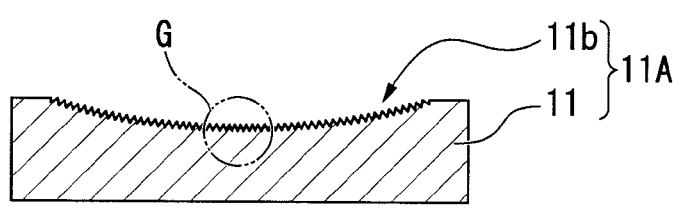
FIG. 3D is a typical process explanatory view showing a manufacturing process, subsequent to FIG. 3C, of the microstructure forming mold of the first embodiment of the present invention.
Figure 3E:
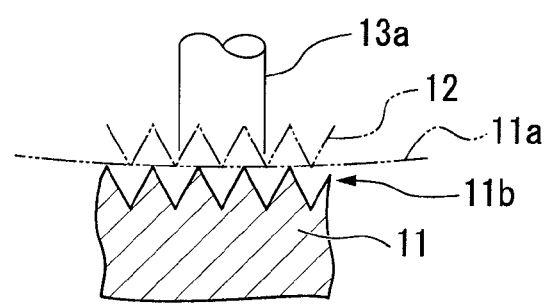
FIG. 3E is a detailed view of a G part of FIG. 3D.

Accordingly, as shown in FIGS. 3D and 3E, at respective positions of the base material surface 11a, etching proceeds in the direction of the normal line of the base material surface 11a along the outer shape of the microstructure body 12, and the shape of the microstructure body 12 is transferred to the master base material 11. This forms a microstructure portion 11b of the master base material 11.

Hereinafter, the master base material 11 formed with the microstructure portion 11b is referred to as a master mold 11A.

Next, as shown in FIG. 4A, a mold 15 that molds the microstructure forming mold 5 is assembled using the master mold 11A, and a mold 14 that transfers the shape of the outer peripheral surface 15c of the microstructure forming mold 5.

Next, the movable shafts 6a and 6b are arranged within the mold 15, a molding material 16 is filled, and insert molding is performed. It is preferable to form tip portions of the movable shafts 6a and 6b in an appropriate anchor shape that improves adhesion with the molding material 16 and prevents slip-out after molding.

If the molding material 16 is cured, the mold 15 is disassembled to release the microstructure forming mold 5 having the movable shafts 6a and 6b connected to an upper portion thereof.

The microstructure forming mold 5 can be manufactured in this way.

In addition, the method of manufacturing the above microstructure forming mold 5 is an example, and can be altered appropriately.

For example, when the master mold 11A is formed, selective etching, such as aluminum anodic oxidation, may be adopted instead of dry etching.

Additionally, for example, in the present example, the microstructure forming mold 5 is an example in which the microstructure forming mold is manufactured by integral molding with the movable shafts 6a and 6b. If the microstructure forming mold 5 is molded integrally with the movable shafts 6a and 6b, the material inside the microstructure forming mold 5 is uniform except for an inserted portion. Therefore, the anisotropy of deformation at individual points when an external force has acted does not occur easily. Additionally, the deformation at the individual points can be predicted with high precision.

However, when the deformation shape of the convex surface 5b can be controlled within an allowable range, it is also possible to constitute the microstructure forming mold 5 from a plurality of materials or to bond a plurality of parts together to form the microstructure forming mold 5.

Additionally, for example, in the above insert molding, it is also possible to insert connecting fittings that are detachably connectable to the tip portions of the movable shafts 6a and 6b instead of the movable shafts 6a and 6b. In this case, the microstructure forming mold 5 is detachably connectable to the tip portions of the movable shafts 6a and 6b via the connecting fittings. As a method of connecting the movable shafts 6a and 6b and connecting fittings, for example, screwing or the like can be adopted.

Next, the optical element manufacturing method of the present embodiment using the surface processing device 10 of the present embodiment will be described.

Figure 5A:
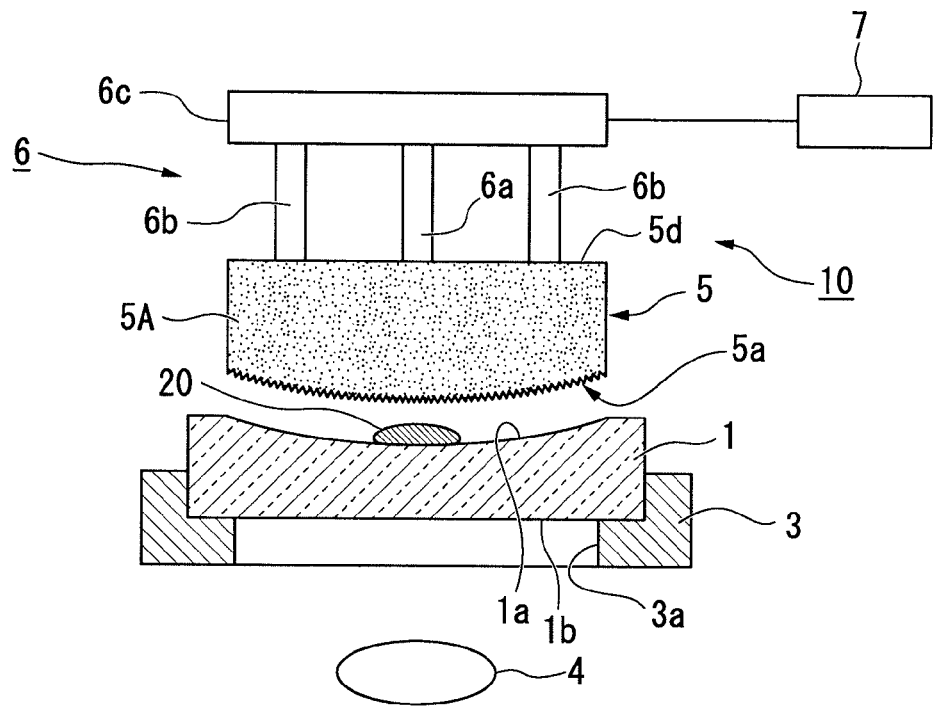
FIG. 5A is a typical process explanatory view of an optical element manufacturing method of the first embodiment of the present invention.
Figure 5B:
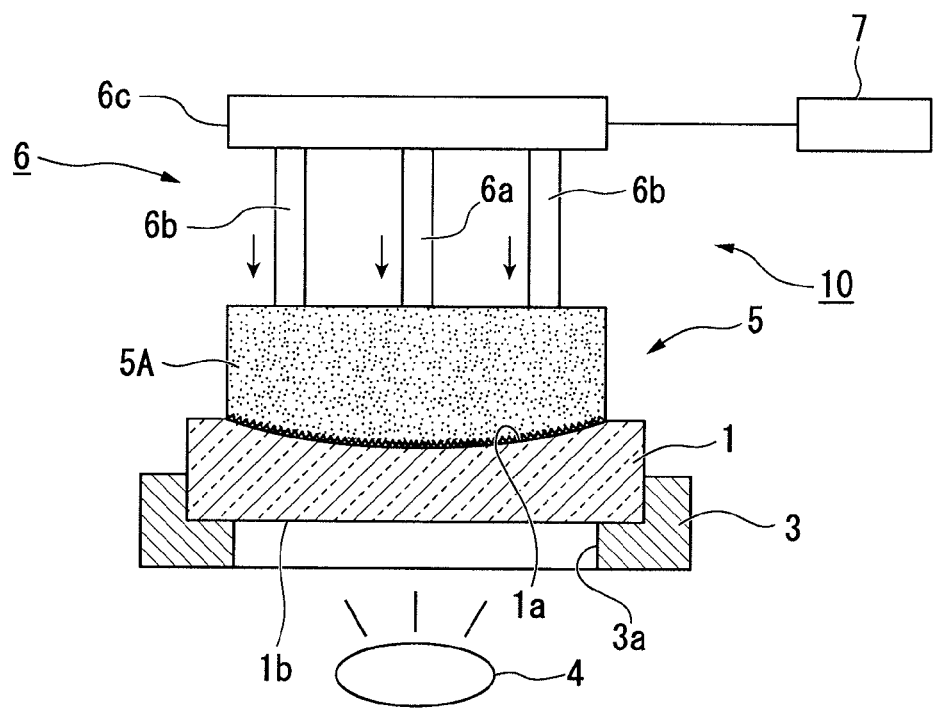
FIG. 5B is a typical process explanatory view of the optical element manufacturing method of the first embodiment of the present invention.
Figure 6A:
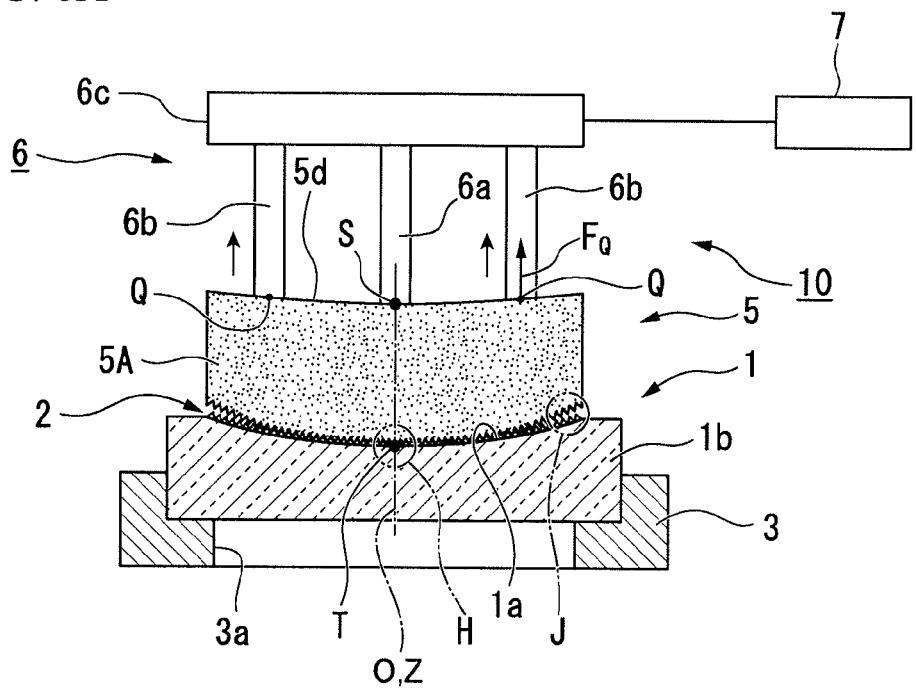
FIG. 6A is a typical process explanatory view, subsequent to FIG. 5B, of the optical element manufacturing method of the first embodiment of the present invention.
Figure 6B:
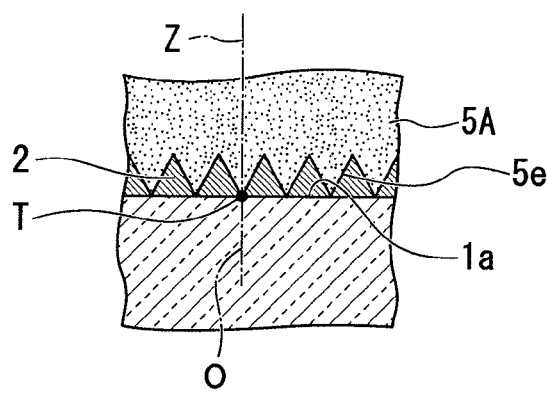
FIG. 6B is a detailed view of an H part of FIG. 6A.
Figure 6C:
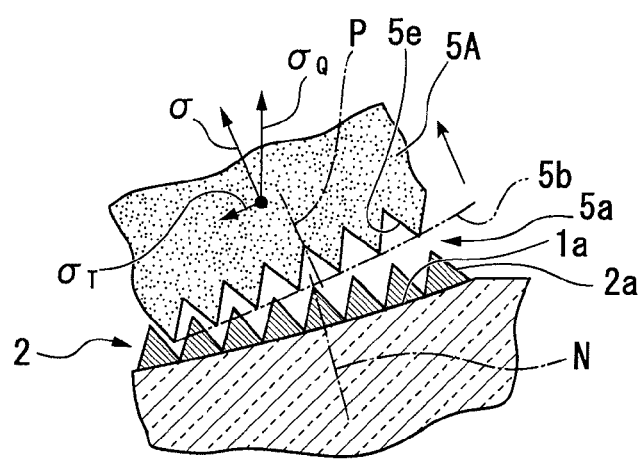
FIG. 6C is a detailed view of a J part of FIG. 6B.
Figure 7A:
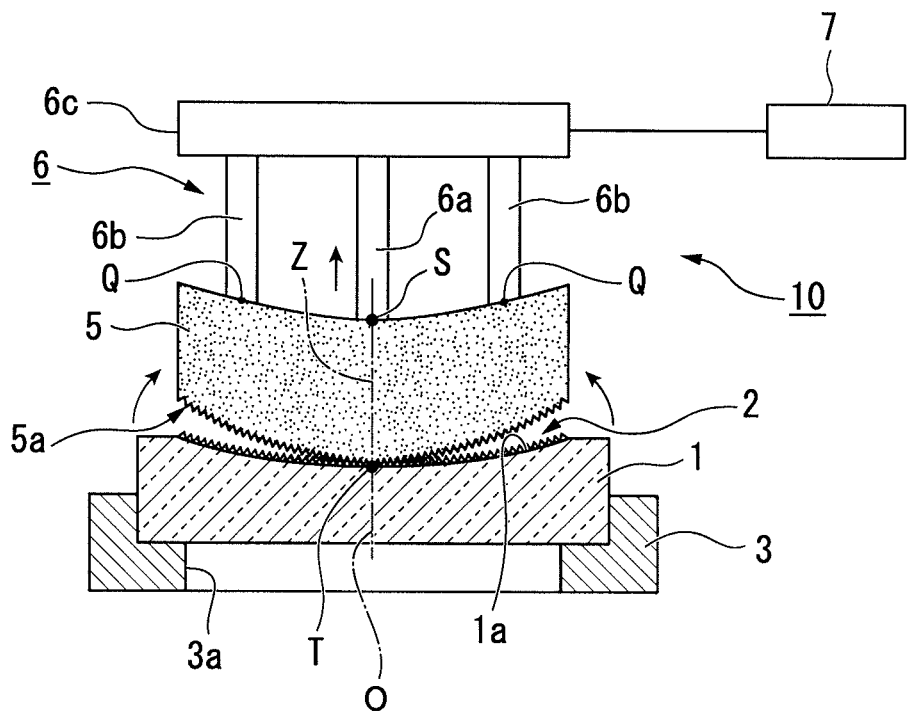
FIG. 7A is a typical process explanatory view, subsequent to FIG. 6A, of the optical element manufacturing method of the first embodiment of the present invention.
Figure 7B:
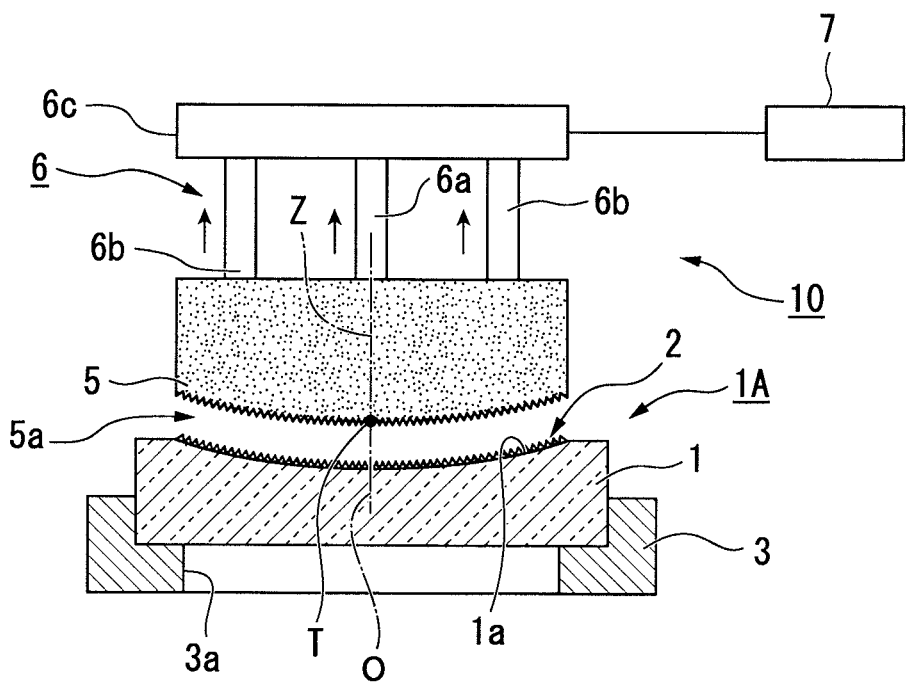
FIG. 7B is a typical process explanatory view, subsequent to FIG. 7A, of the optical element manufacturing method of the first embodiment of the present invention.

FIGS. 5A and 5B are typical process explanatory views of the optical element manufacturing method of the first embodiment of the present invention. FIG. 6A is a typical process explanatory view, subsequent to FIG. 5B, of the optical element manufacturing method of the first embodiment of the present invention. FIG. 6B is a detailed view of an H part in FIG. 6A, and FIG. 6C is a detailed view of a J part in FIG. 6A. FIGS. 7A and 7B are typical process explanatory views, subsequent to FIG. 6A, of the optical element manufacturing method of the first embodiment of the present invention.

The optical element manufacturing method of the present embodiment includes a main body processing process, a molding process, and a mold release process.

The main body processing process is a process of forming an optical element main body having an optical surface.

In the present process, for example, appropriate processing, such as cutting and polishing, glass molding, or resin molding, is performed to form the lens main body (optical element main body) 1 having the concave lens surface (optical surface) 1a.

Next, the molding process is performed. The microstructure forming mold 5 has a molding surface that is formed on the surface of a deformable base body and transfers a microstructure. The present process is a process of coating molding resin on the optical surface, pressing a microstructure forming mold against the optical surface, and curing the molding resin.

In the present process, first, as shown in FIG. 5A, the lens main body 1 is caused to be held by the holding part 3 of the surface processing device 10 in a posture where the concave lens surface 1a is directed to the microstructure forming mold 5.

At this time, the microstructure forming mold 5 is retracted to the retracted position above the holding part 3.

In addition, in the present process, the mold movement control unit 7 controls the shaft moving mechanism 6c in the parallel movement mode.

Next, a UV-curable resin 20 (molding resin) is coated on the concave lens surface 1a. As for the kind of UV-curable resin 20, in the present embodiment, PAK-02 (tradename) is used as an example.

The UV-curable resin 20, as shown in FIG. 5A, may be coated in a lump on a central portion so as to spread to an outer peripheral portion when the microstructure forming mold 5 is pressed as will be described below. The UV-curable resin may be coated in the form of a layer on the whole concave lens surface 1a in advance, for example, by spin coating or the like.

Next, the mold movement control unit 7 delivers a control signal to the shaft moving mechanism 6c to move the movable shafts 6a and 6b vertically downward and lower the microstructure forming mold 5, as shown in FIG. 5B.

At this time, since the shaft moving mechanism 6c is controlled in the parallel movement mode, the convex surface 5b (not shown in FIG. 5B) of the molding surface portion 5a is lowered while maintaining curvature that substantially coincides with the curvature of the concave lens surface 1a.

For this reason, the convex surface 5b of the microstructure forming mold 5 is pressed against the concave lens surface 1a with the UV-curable resin 20 sandwiched, and the convex surface 5b is brought into close contact with the concave lens surface 1a.

If the microstructure forming mold 5 is lowered until the convex surface 5b and the concave lens surface 1a come into close contact with each other, the mold movement control unit 7 stops the lowering of the microstructure forming mold 5 by the shaft moving mechanism 6c.

This allows the UV-curable resin 20 to be filled into a molding space formed between the molding surface portion 5a and the concave lens surface 1a.

For this reason, the mold moving part 6 and the mold movement control unit 7 constitute the mold pressing part that moves the microstructure forming mold 5 relative to the concave lens surface 1a on which the UV-curable resin 20 is coated and brings the concave lens surface 1a into close contact with the UV-curable resin 20.

Additionally, the movable shaft 6a of the mold moving part 6 constitutes a center pressing member that holds down a central portion of the microstructure forming mold 5.

Next, the UV light source 4 is turned on. This allows ultraviolet light to enter the lens main body 1 from the hole portion 3a and allows ultraviolet light to be emitted to the concave lens surface 1a from the inside of the lens main body 1.

As a result, the UV-curable resin 20 filled into the molding space sandwiched between the concave lens surface 1a and the molding surface portion 5a is photo-cured and the reflection preventing part 2 is formed on the concave lens surface 1a.

For this reason, the UV light source 4 constitutes the resin curing part that cures the UV-curable resin 20 sandwiched between the concave lens surface 1a and the molding surface portion 5a of the microstructure forming mold 5.

If the curing of the UV-curable resin 20 is completed, the UV light source 4 is turned off.

The molding process is completed above.

Next, the mold release process is performed. The present process is a process of exerting a moment of a force relating to the surface top of the molding surface on the microstructure forming mold so as to deform the base body to separate the microstructure forming mold gradually from the concave lens surface 1a in a direction in which a concavo-convex shape extends from the outer peripheral side of the mold, thereby performing the mold release of the microstructure forming mold.

In the present process, the mold movement control unit 7 controls the shaft moving mechanism 6c in the mold release mode.

That is, as shown in FIG. 6A, the position of the movable shaft 6a is fixed and the respective movable shafts 6b are gradually moved vertically upward. This allows an upper portion of the base body part 5A connected to the movable shafts 6b to be pulled up together with the movable shafts 6b. For this reason, an external force $F_Q$ that is directed vertically upward acts on the upper portion of the base body part 5A at each of the connecting positions Q of the movable shafts 6b, and the upper portion of the base body part 5A is pulled up. On the other hand, since the movable shaft 6a does not move, the connecting positions S on the central axis Z connected are fixed. As a result, the upper portion of the base body part 5A is gradually deformed in a concave shape with the movement of the movable shafts 6b.

In contrast, in the molding surface portion 5a that is a lower surface of the base body part 5A, as shown in FIGS. 6A and 6B, a surface top T on the central axis Z is pressed against the concave lens surface 1a and the movement thereof is constrained. Therefore, a moment of a force around the surface top T acts on the base body part 5A due to the external forces $F_Q$.

For this reason, a stress generated at the lower portion of the base body part 5A, as shown in FIG. 6C, becomes a resultant stress σ of a vertical upward stress $σ_Q$ originating from the external force $F_Q$, and a stress $σ_T$ along the convex surface 5b originating from restraint caused by the close contact between the molding surface portion 5a and the reflection preventing part 2.

Accordingly, by suitably setting the magnitude of the external force $F_Q$, the direction of the resultant stress σ can be made to substantially coincide with the direction of the normal line N of the concave lens surface 1a on the outer peripheral side of the molding surface portion 5a.

If the movable shafts 6b are pulled up, the molding surface portion 5a on the outer peripheral side is pulled substantially in the direction of the normal line N of the concave lens surface 1a. For this reason, since rubbing does not occur between the projections 2a of the reflection preventing part 2 and the holes 5e of the molding surface portion 5a, the molding surface portion 5a and the reflection preventing part 2 are separated gradually from the outer peripheral side of the molding surface portion 5a without receiving large mold release resistance. For this reason, the projections 2a are released from the microstructure forming mold 5 without being damaged.

As described above, in the present embodiment, the mold release proceeds as the molding surface portion 5a is peeled off in the upward direction along the central axis Z due to the deformation of the base body part 5A. In that case, the curvature of the convex surface 5b of the molding surface portion 5a becomes large with the movement of the movable shafts 6b.

At this time, the aspects of changes in curvature are slightly different depending on conditions, such as the effective diameter of the concave lens surface 1a, the material constant of the base body part 5A, and the movement speed of the movable shaft 6a.

For example, when the material of the base body part 5A is hard or the adhesion force between the molding surface portion 5a and the reflection preventing part 2 is small, the deformation of the convex surface 5b proceeds simultaneously at individual points, and the curvature of the convex surface 5b varies as a whole. In this case, the separation of the molding surface portion 5a takes place substantially simultaneously both on the outer peripheral side and the inner peripheral side.

On the other hand, when the material of the base body part 5A is soft or the adhesion force between the molding surface portion 5a and the reflection preventing part 2 is large, the deformation of the convex surface 5b propagates gradually from the outer peripheral side to the inner peripheral side. Therefore, the curvature of the convex surface 5b increases gradually from the outer peripheral side, and the separation proceeds gradually from the outer peripheral side while a state where the molding surface portion 5a and the reflection preventing part 2 are brought into close contact with each other is maintained at the central portion. In this case, the curvature of the convex surface 5b varies partially.

Which aspect the mold release is performed in can be appropriately selected according to the shape of the concave lens surface 1a, the releasability of the reflection preventing part 2, or the like.

The mold moving part 6 and the mold movement control unit 7 constitute the mold-deforming part that causes a moment of a force relating to the surface top T of the convex surface 5b on the microstructure forming mold 5 to be exerted and that causes the base body part 5A to be deformed from the outer peripheral side of the microstructure forming mold 5 so that the molding surface portion 5a is separated gradually from the UV-curable resin 20 in the direction in which the projections 2a extend (the projections 2a protrude).

As shown in FIG. 7A, if the mold release of the molding surface portion 5a proceeds to the vicinity of the central axis Z in this way, the mold movement control unit 7 releases the fixation of the position of the movable shaft 6a, and pulls up the movable shaft 6a so as to follow the movable shafts 6b. This allows the molding surface portion 5a in the vicinity of the central axis Z of the molding surface portion 5a to be separated from the reflection preventing part 2 in the vicinity of the optical axis O of the concave lens surface 1a.

For this reason, the mold moving part 6 and the mold movement control unit 7 constitute the mold releasing and moving part that moves the microstructure forming mold 5 and the holding part 3 relative to each other so as to be separated from each other in the direction of the optical axis O when the separation proceeds to the central portion of the molding surface portion 5a.

The mold release of the reflection preventing part 2 is completed above.

If the whole surface of the molding surface portion 5a is separated from the reflection preventing part 2, the mold release process is completed.

The lens 1A is manufactured in this way.

Next, as shown in FIG. 7B, the mold movement control unit 7 releases the mold release mode and shifts to the parallel movement mode. That is, the position of the movable shafts 6a and 6b is returned to the reference state, and the microstructure forming mold 5 is moved in parallel and moved to the retracted position and hold it.

Then, the lens 1A is detached from the holding part 3. When the reflection preventing part 2 is formed on another lens main body 1, the above molding process and mold release process are repeated similarly.

According to the optical element manufacturing method of the present embodiment, the mold release can be performed by molding the reflection preventing part 2, using the microstructure forming mold 5 having the molding surface portion 5a, to which the shape of the reflection preventing part 2 that is a microstructure is transferred, on the surface of the deformable base body part 5A, and by deforming the base body part 5A to gradually separate the microstructure forming mold 5 in the direction in which the projections 2a of the reflection preventing part 2 extend from the outer peripheral side of the mold.

For this reason, when mold-releasing the reflection preventing part 2 in which the projections 2a extending in the direction intersecting the optical axis O are assembled on the concave lens surface 1a having the curvature of the lens 1A, the microstructure forming mold 5 can be easily released even if the mold is extracted in the direction of the optical axis O because mold release resistance is low. Additionally, the mold release can be performed without damaging the projections 2a of the reflection preventing part 2. Additionally, the mold release can be performed without degrading the shape accuracy of the projections 2a.

Additionally, since the reflection preventing part 2 including an aggregate of the projections 2a extending in the direction of the normal line N of the concave lens surface 1a can be formed, the reflection preventing characteristics of the concave lens surface 1a of the lens 1A can be improved compared to a case where a multilayer is used or a reflection preventing structure including only projections extending in the direction of the optical axis is used.

Additionally, according to the surface processing device 10 of the present embodiment, the base body part 5A and the molding surface portion 5a of the microstructure forming mold 5 are formed from an elastic body that has a low elastic modulus and is easily deformed. As a result, even if the curvature of the convex surface 5b of the molding surface portion 5a is different from the curvature of the concave lens surface 1a, the base body part 5A and the molding surface portion 5a can be deformed and brought into close contact with the concave lens surface 1a by pressing the molding surface portion 5a against the lens 1A. Accordingly, the reflection preventing part 2 with a stable shape can be formed, for example, even when there is a manufacturing error in the shape of the molding surface portion 5a or the concave lens surface 1a.

Additionally, in the surface processing device 10, the base body part 5A and the molding surface portion 5a can be deformed by the mold moving part 6. Therefore, the shape of the convex surface 5b of the molding surface portion 5a can be corrected by adjusting the positional relationship between the movable shafts 6a and 6b in the reference state. For this reason, the manufacturing costs of the microstructure forming mold 5 can be reduced, and the molding precision of the reflection preventing part 2 can be improved.

Second Embodiment

An optical element surface processing device of a second embodiment of the present invention will be described.

Figure 8:
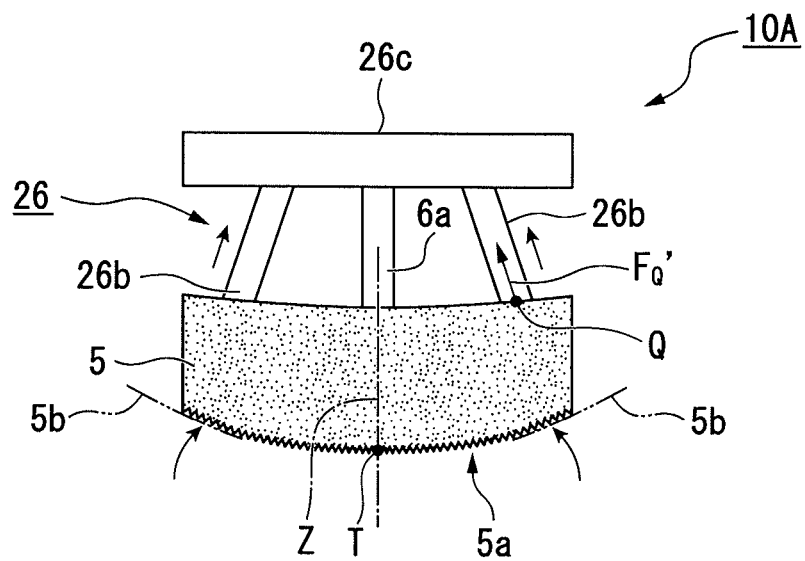
FIG. 8 is a typical cross-sectional view showing the configuration of main portions of an optical element surface processing device of a second embodiment of the present invention.

FIG. 8 is a typical cross-sectional view showing the configuration of main portions of the optical element surface processing device of the second embodiment of the present invention.

A surface processing device 10A of the present embodiment, as shown in FIG. 8, includes a mold moving part 26 (a mold pressing part, a mold-deforming part, a mold releasing and moving part) instead of the mold moving part 6 of the surface processing device 10 of the above first embodiment.

The mold moving part 26 includes movable shafts 26b and a shaft moving mechanism 26c instead of the movable shafts 6b and the shaft moving mechanism 6c of the mold moving part 6 of the above first embodiment.

Hereinafter, differences from the above first embodiment will mainly be described.

The movable shafts 26b are provided such that the upper end portions of the movable shafts 6b in the above first embodiment extend in oblique upward directions that are directed to the central axis Z.

The shaft moving mechanism 26c advances and retracts the movable shaft 6a similar to the shaft moving mechanism 6c of the above first embodiment, and advances and retracts the respective movable shafts 26b in their respective axial directions. As the configuration of the shaft moving mechanism 26c, the same configuration as the shaft moving mechanism 6c of the above first embodiment can be adopted except for a movement direction.

By virtue of such a configuration, in the surface processing device 10A, the movable shafts 26b can be moved in the oblique upward direction to exert an external force $F_Q'$ at a connecting position Q so as to generate a moment of a force around the surface top T. For this reason, the upper portion of the microstructure forming mold 5 can be pulled up in the oblique upward directions that are directed to the central axis Z.

It is preferable that the oblique directions of the movable shafts 26b be directions in which that extension lines of central axes of the movable shafts 26b substantially coincide with (including coincide with) the normal line of the convex surface 5b before the deformation of the molding surface portion 5a.

According to the surface processing device 10A of the present embodiment, the lens 1A can be manufactured similar to the above first embodiment.

In the present embodiment, since the movable shafts 26b can be pulled up in the oblique upward directions that are directed to the central axis Z, the control of moving the molding surface portion 5a along the direction of the normal line before the deformation of the convex surface 5b becomes easier.

Third Embodiment

An optical element surface processing device of a third embodiment of the present invention will be described.

Figure 9:
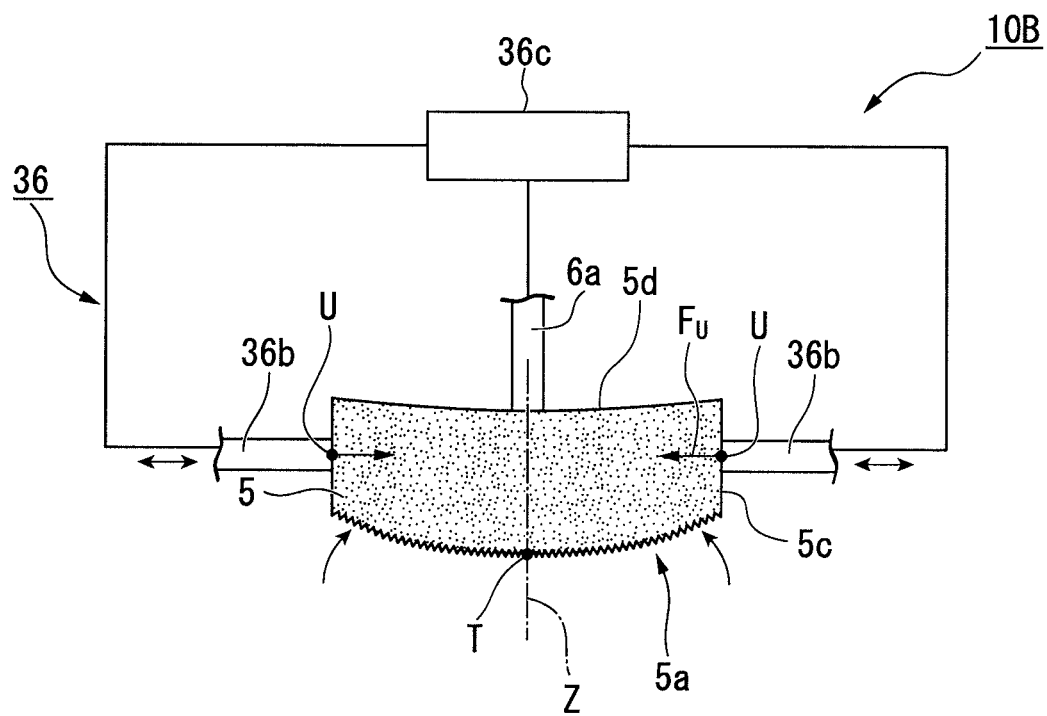
FIG. 9 is a typical cross-sectional view showing the configuration of main portions of an optical element surface processing device of a third embodiment of the present invention.

FIG. 9 is a typical cross-sectional view showing the configuration of main portions of the optical element surface processing device of the third embodiment of the present invention.

A surface processing device 10B of the present embodiment, as shown in FIG. 9, includes a mold moving part 36 (a mold pressing part, a mold-deforming part, a mold releasing and moving part) instead of the mold moving part 6 of the surface processing device 10 of the above first embodiment.

The mold moving part 36 includes movable shafts 36b and a shaft moving mechanism 36c instead of the movable shafts 6b and the shaft moving mechanism 6c of the mold moving part 6 of the above first embodiment.

Hereinafter, differences from the above first embodiment will mainly be described.

The movable shafts 36b are provided at a plurality of positions where the outer peripheral surface 5c of the microstructure forming mold 5 is equally divided in the circumferential direction, and advance and retract on a horizontal line passing along the central axis Z of the microstructure forming mold 5.

The respective movable shafts 36b are aligned and arranged on the same horizontal surface at positions near an upper end side of the outer peripheral surface 5c.

The shaft moving mechanism 36c advances and retracts the movable shaft 6a similar to the shaft moving mechanism 6c of the above first embodiment, and advances and retracts the respective movable shafts 36b in their respective axial directions. As the configuration of the shaft moving mechanism 36c, the same configuration as the shaft moving mechanism 6c of the above first embodiment can be adopted except for a movement direction.

By virtue of such a configuration, in the surface processing device 10B, the movable shafts 36b can be moved toward the central axis Z to exert an external force $F_U$ at a connecting position U on the outer peripheral surface 5c so as to generate a moment of a force around the surface top T. For this reason, the base body part 5A on the lower side can be pulled up in an oblique upward direction toward the central axis Z by compressing a side surface on an outer peripheral side of the microstructure forming mold 5 toward a center side thereof.

The present embodiment is particularly effective when the material of the microstructure forming mold 5 is a rubber material with a large Poisson's ratio.

The movement direction of the movable shafts 36b is not limited to the horizontal direction if the outer peripheral surface 5c can be pressed toward the center side. For example, even a configuration in which the movable shafts move in oblique upward directions toward the center, the base body part 5A on the lower side can be pulled up in the oblique upward directions toward the central axis Z even if a material whose Poisson's ratio is particularly large is not used.

According to the surface processing device 10B of the present embodiment, the lens 1A can be manufactured similar to the above first embodiment.

Since the present embodiment can also be applied to, for example, a case where the diameter of the lens of the lens 1A is small and the upper surface 5d of the microstructure forming mold 5 is narrow, the present embodiment is particularly suitable for manufacturing of small-diameter optical elements.

Fourth Embodiment

An optical element surface processing device of a fourth embodiment of the present invention will be described.

Figure 10A:
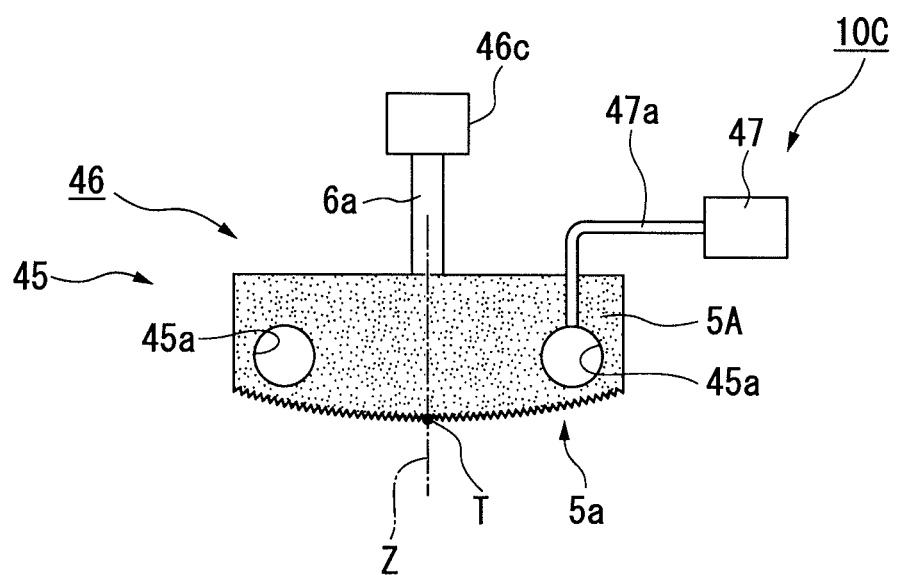
FIG. 10A is a typical cross-sectional view showing the configuration of main portions of an optical element surface processing device of a fourth embodiment of the present invention.
Figure 10B:
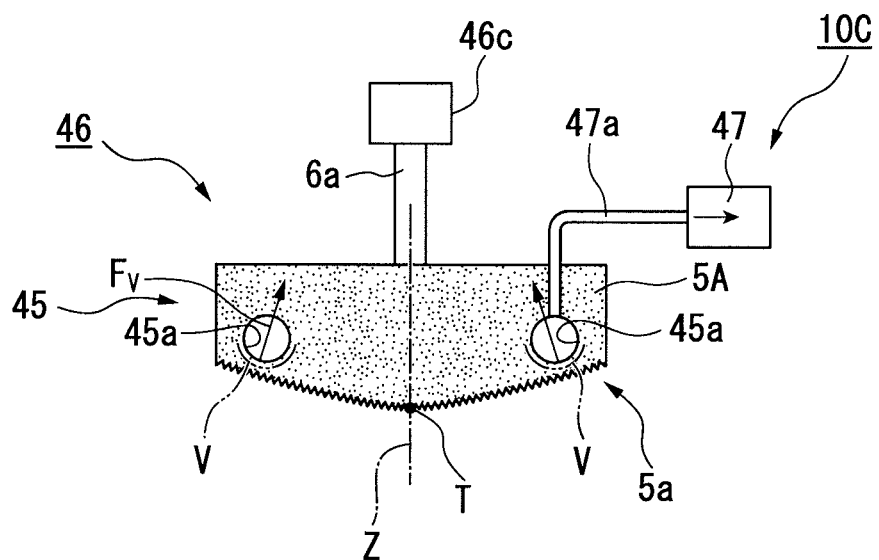
FIG. 10B is a typical operation explanatory view showing the configuration of the main portions of the optical element surface processing device of the fourth embodiment of the present invention.

FIG. 10A is a typical cross-sectional view showing the configuration of main portions of the optical element surface processing device of the fourth embodiment of the present invention, and FIG. 10B is a typical operation explanatory view showing the configuration of the main portions of the optical element surface processing device of the fourth embodiment of the present invention.

A surface processing device 10C of the present embodiment, as shown in FIG. 10A, includes a microstructure forming mold 45 and a mold moving part 46 (a mold pressing part, a mold releasing and moving part) instead of the microstructure forming mold 5 and the mold moving part 6 of the surface processing device 10 of the above first embodiment, and has a fluid supply unit 47 (mold-deforming part) added thereto.

Hereinafter, differences from the above first embodiment will mainly be described.

In the microstructure forming mold 45, the movable shafts 6b are eliminated from the microstructure forming mold 5 of the above first embodiment, and an annular cavity portion 45a is added to the inside of the base body part 5A.

The annular cavity portion 45a, which is an annular space having a circular or elliptical cross-section, is formed with the central axis Z as a center. A fluid supply pipe 47a made of a metallic pipe or the like passes through an upper portion of the annular cavity portion 45a, and inflow and discharge of a fluid are allowed between the annular cavity portion and the outside through the fluid supply pipe 47a.

In the mold moving part 46, the movable shafts 6b of the mold moving part 6 of the above first embodiment are eliminated, and the shaft moving mechanism 46c is included instead of the shaft moving mechanism 6c.

In the shaft moving mechanism 46c, the function of advancing and retracting the movable shafts 6b is eliminated from the shaft moving mechanism 6c of the above first embodiment.

The fluid supply unit 47 delivers or suctions a fluid to/from the fluid supply pipe 47a. Although illustration of the detailed configuration of the fluid supply unit 47 is omitted, the fluid supply unit includes, for example, a fluid storage part that stores a fluid, a pump part that delivers or suctions a fluid to/from the fluid supply pipe 47a, and a pressure control part that controls the operations of the pump part.

The fluid that the fluid supply unit 47 supplies may be, for example, gases, such as air, or for example liquids, such as water. In the present embodiment, as an example, the fluid supply unit 47 can supply air and control air pressure to thereby control the volume of the annular cavity portion 45a.

By virtue of such a configuration, in the surface processing device 10C, as shown in FIG. 10A, the inside of the annular cavity portion 45a is maintained at constant air pressure, so that the molding surface portion 5a can be formed in a shape resembling the shape of the concave lens surface 1a and the molding process can be performed similar to the above first embodiment.

Additionally, in order to perform the mold release process, as shown in FIG. 10B, the volume of the annular cavity portion 45a is reduced by suctioning air within the annular cavity portion 45a, using the fluid supply unit 47.

This allows an external force $F_V$ of pulling up the base body part 5A in an oblique upward direction toward the central axis Z to be exerted on a portion V that faces the molding surface portion 5a, in the inner peripheral surface of the annular cavity portion 45a.

Since the external force $F_V$ generates a moment of a force around the surface top T, the base body part 5A below the portion V can be pulled up in the oblique upward direction toward the central axis Z, similar to the above first embodiment.

For this reason, the mold release process can be performed similar to the above first embodiment.

In the present embodiment, the mold moving part 46 constitutes the mold pressing part and the mold releasing and moving part, and the fluid supply unit 47 constitutes the mold-deforming part.

According to the surface processing device 10C of the present embodiment, since the inside of the microstructure forming mold 45 is deformed by the fluid supply unit 47, the deformation of the base body part 5A can be controlled at a position near the molding surface portion 5a.

In the present embodiment, an example in which the annular cavity portion 45a is provided in one place has been described. However, it is also possible to further arrange annular cavity portions 45a concentrically in two or more places.

In this case, since the deformation of the molding surface portion 5a during mold release from the outer peripheral side toward the central portion can be finely and gradually changed by controlling to sequentially switch the deformation of the plurality of annular cavity portions 45a, the load of the mold release on the reflection preventing part 2 can be reduced further.

Although an example in which the optical element is a lens has been described in the descriptions of the above respective embodiments, the optical element manufactured by the optical element manufacturing method of the present invention is not limited to the lens. For example, optical elements, such as a mirror, a prism, and a filter, may be used.

Although an example in which the optical surface of the optical element is the concave spherical surface has been described in the descriptions of the above respective embodiments, the optical surface is not limited to the concave spherical surface, and may be an aspheric surface. Additionally, the optical surface may be a convex surface.

When the optical surface is a convex surface, a person skilled in the art will easily understand differences from the above descriptions. For example, when the optical surface is the convex surface, the molding surface portion 5a of the microstructure forming mold 5 is formed in the shape of a concave surface. Accordingly, the microstructure forming mold can be separated in the direction in which the projections 2a of the reflection preventing part 2 extend by exerting a moment of a force relating to a surface top of the concave surface and deforming the base body part 5A so that the curvature of the concave surface of the molding surface portion 5a becomes large.

Additionally, an example in which the microstructure is the reflection preventing part 2 based on the conical projections 2a has been described in the descriptions of the above respective embodiments. However, a shape of which the refractive index varies in the vicinity of the lens surface may be sufficient in order to form the reflection preventing structure, and pyramidal bodies not only in the conical shape but also in a triangular pyramidal shape, a quadrangular pyramidal shape, and the like, may be adopted favorably.

Additionally, although an example in which the microstructure is the reflection preventing structure has been described in the descriptions of the above respective embodiments, the microstructure is not limited to the pyramidal bodies if the microstructure has a concavo-convex shape formed by nanoimprint technology. For example, concavo-convex shapes, such as a column, a column hole, a hole shape obtained by reversing a pyramidal body, and a bell shape, can be adopted.

For this reason, the microstructure is not limited to the reflection preventing structure.

Additionally, although an example in which the optical axis of the optical element is arranged along the vertical axis and the microstructure forming mold is moved along the vertical axis has been described in the descriptions of the above respective embodiments, such a positional relationship is an example, and respective members may be arranged in different orientations as long as the same relative positional relationship is provided.

Additionally, although an example in which the movable shafts 6b and 26b are arranged on one circle $C_1$ has been described in the descriptions of the above first and second embodiments, a configuration may be adopted in which the movable shafts are provided on a plurality of circles that form concentric circles. In this case, since the deformation amount of the molding surface portion 5a can be more finely controlled by gradually moving the movable shafts on the respective circles from the outer peripheral side toward the central portion, the load of the mold release on the reflection preventing part 2 can be reduced further.

Additionally, although an example in which the optical element is fixed and the microstructure forming mold is moved has been described in the descriptions of the above respective embodiments, the mold pressing part and the mold releasing and moving part may be configured such that the movable shaft 6a is substituted with a fixed shaft and a moving mechanism that advances and retracts the holding part 3 with respect to the microstructure forming mold 5 is provided.

Additionally, the microstructure forming mold 5 and the holding part 3 may be movably supported, and both may constitute the mold pressing part and the mold releasing and moving part.

Additionally, although an example in which the molding surface portion 5a is formed from the same material as the base body part on the surface of the base body part 5A has been described in the descriptions of the above respective embodiments, the base body may be configured such that a plurality of elastic bodies of the same material or different materials are integrated by bonding or molding.

Additionally, all the constituent elements described in the above embodiments may be carried out by appropriate combinations or omissions within the scope of the technical idea of the present invention.

The invention claimed is:

1. A method for forming a microstructure on a concavo-convex optical surface of an optical element having an optical axis, the method comprising:
   placing a molding resin on the optical surface;
   pressing a flexible microstructure forming surface onto the molding resin so as to form an uncured microstructure on the optical surface;
   curing the molding resin to form a cured microstructure on the optical surface, the cured microstructure having a circular outer periphery and a center as viewed along a plane perpendicular to the optical axis; and
   separating the flexible microstructure forming surface from the cured microstructure by lifting and bending the microstructure forming surface in such a manner that:
      the flexible microstructure forming surface is separated from the cured microstructure in a sequence beginning at the outer periphery of the cured microstructure and moving inwardly toward the center of the cured microstructure; and
      at each point where the flexible microstructure forming surface is separated from the cured microstructure it does so in a direction that is substantially normal to the optical surface.

2. The method of claim 1, wherein the cured microstructure surface is an anti-reflective surface.

3. The method of claim 2, wherein the cured microstructure surface is an assembly of pyramidal bodies.

4. The method of claim 1, wherein the flexible microstructure forming surface is a surface of an elastic mold and the flexible microstructure forming surface is separated from the cured microstructure by deforming the shape of the elastic mold.

5. The method of claim 4, wherein the elastic mold includes a generally cylindrical shape with a bottom surface on which the flexible microstructure forming surface is located, a top surface which opposes the bottom surface and a side surface.

6. The method of claim 5, wherein the flexible microstructure forming surface is separated from the cured microsurface by applying:
   a first external force to the top surface of the elastic mold at a location corresponding to the center of the cured microstructure whereby the flexible microstructure forming surface is pressed against the center of the cured microstructure; and
   a plurality of second external forces to the top surface of the elastic mold at positions located between the center and the outer periphery of the cured microstructure in a direction which moves the flexible microstructure forming surface away from the cured microstructure.

7. The method of claim 6, wherein the plurality of second external forces are applied at positions located symmetrically around the center of the cured microstructure.

8. The method of claim 4, wherein the flexible microstructure forming surface is separated from the cured microsurface by applying:
   a first external force to the top surface of the flexible mold at a location corresponding to the center of the cured microstructure whereby the flexible microstructure forming surface is pressed against the center of the cured microstructure; and
   a plurality of second forces to the cylindrical side surface of the flexible mold.

9. The method of claim 8, wherein the plurality of second forces are applied radially with respect to the optical axis.

10. The method of claim 1, wherein the flexible microstructure forming surface is separated from the cured microsurface in a symmetrical manner beginning at the outer periphery of the cured microsurface and moving inward to the center of the cured microsurface.

11. Apparatus for forming a microstructure on a concavo-convex optical surface of an optical element having an optical axis when an uncured molding resin is located on the optical surface, the apparatus comprising:
   an elastic mold having a flexible microstructure forming surface;
   means for pressing the flexible microstructure forming surface onto the molding resin so as to form an uncured microstructure on the optical surface;
   means for curing the molding resin to form a cured microstructure on the optical surface, the cured microstructure having a circular outer periphery and a center as viewed along a plane perpendicular to the optical axis; and
   means for separating the flexible microstructure forming surface from the cured microstructure by lifting and bending the microstructure forming surface in such a manner that:
      the flexible microstructure forming surface is separated from the cured microstructure in a sequence beginning at the outer periphery of the cured microstructure and moving inwardly toward the center of the cured microstructure; and
      at each point where the flexible microstructure forming surface is separated from the cured microstructure it does so in a direction that is substantially normal to the optical surface.

12. The apparatus of claim 11, wherein the cured microstructure surface is an anti-reflective surface.

13. The apparatus of claim 12, wherein the cured microstructure surface is an assembly of pyramidal bodies.

14. The apparatus of claim 10, wherein the elastic mold includes a generally cylindrical shape with a bottom surface on which the flexible microstructure forming surface is located, a top surface which opposes the bottom surface and a side surface.

15. The apparatus of claim 14, wherein the means for separating the flexible microstructure forming surface from the cured microstructure applies:
- a first external force to the top surface of the elastic mold at a location corresponding to the center of the cured microstructure whereby the flexible microstructure forming surface is pressed against the center of the cured microstructure; and
- a plurality of second external forces to the top surface of the elastic mold at positions located between the center and the outer periphery of the cured microstructure in a direction which moves the flexible microstructure forming surface away from the cured microstructure.

16. The apparatus of claim 14, wherein the plurality of second external forces are applied at positions located symmetrically around the center of the cured microstructure.

17. The apparatus of claim 14, wherein the side surface is a cylindrical side surface and the means for separating the flexible microstructure forming surface from the cured microstructure applies:
- a first external force to the top surface of the flexible mold at a location corresponding to the center of the cured microstructure whereby the flexible microstructure forming surface is pressed against the center of the cured microstructure; and
- a plurality of second forces to the cylindrical side surface of the flexible mold.

18. The apparatus of claim 17, wherein the plurality of second forces are applied radially with respect to the optical axis.

* * * * *